(12) United States Patent
Cohen

(10) Patent No.: US 6,422,462 B1
(45) Date of Patent: Jul. 23, 2002

(54) APPARATUS AND METHODS FOR IMPROVED CREDIT CARDS AND CREDIT CARD TRANSACTIONS

(76) Inventor: Morris E. Cohen, c/o 757 Third Ave., Suite 2400, New York, NY (US) 10017

( * ) Notice: Subject to any disclaimer, the term of this patent is extended or adjusted under 35 U.S.C. 154(b) by 0 days.

(21) Appl. No.: 09/280,483

(22) Filed: Mar. 30, 1999

Related U.S. Application Data

(60) Provisional application No. 60/079,884, filed on Mar. 30, 1998.

(51) Int. Cl.[7] .................................................. G06F 7/08
(52) U.S. Cl. ......................... 235/381; 235/380; 705/41
(58) Field of Search ................................. 235/487, 382, 235/380, 395, 492, 379; 705/35, 38, 39, 1, 20, 26, 41

(56) References Cited

U.S. PATENT DOCUMENTS

| | | | | |
|---|---|---|---|---|
| 5,293,424 A | * | 3/1994 | Holtey et al. ................. 380/23 |
| 5,696,965 A | * | 12/1997 | Dedrick ....................... 395/610 |
| 5,705,798 A | * | 1/1998 | Tarbox ......................... 235/379 |
| 5,706,442 A | * | 1/1998 | Anderson et al. ........... 395/227 |
| 5,745,654 A | * | 4/1998 | Titan ............................ 395/22 |
| 5,749,075 A | * | 5/1998 | Toader et al. ................ 705/14 |
| 5,963,643 A | * | 10/1999 | Goreta et al. .................. 380/9 |
| 5,970,478 A | * | 10/1999 | Walker et al. ................ 705/35 |
| 6,003,134 A | * | 12/1999 | Kuo et al. .................... 713/200 |
| 6,014,645 A | * | 1/2000 | Cunningham ................ 705/38 |
| 6,145,741 A | * | 11/2000 | Wisdom et al. ............. 235/380 |

\* cited by examiner

Primary Examiner—Thien M. Le

(57) ABSTRACT

Customized credit and debit cards for issuance by a person or main cardholder, the cards being limited to use in transactions at selected vendors only. Thus, for example, a parent or corporation can issue a customized card to a person or group, wherein the card is only valid for use at restaurants, airlines, hotels, certain stores, or so forth.

25 Claims, 1 Drawing Sheet

Credit card: normally in an "off" state

Card turned on by the cardholder for a limited time period, use, etc., preferably by a call to the company or using a computer to send information to the credit card company Card is on, and transactions during that time period, or for that use, etc. are authorized/ approved by the credit card company when the vendor requests an authorization/ approval Time period elapses, use occurs, etc.

Card reverts to an "off" state, and no transactions will be authorized/approved

Process is repeated by the cardholder with the card as often as the cardholder desires

APPARATUS AND METHODS FOR IMPROVED CREDIT CARDS AND CREDIT CARD TRANSACTIONS

RELATED APPLICATIONS

The present application claims all rights of priority to U.S. Provisional Application Ser. No. 60/079,884 filed Mar. 30, 1998.

BACKGROUND OF THE INVENTION

Credit cards are currently a common financial tool. Yet, credit card fraud is a considerable concern for credit card companies. The problem occurs when an unscrupulous individual obtains a copy of a person's credit card information, and then uses that information to fraudulently charge purchases to the person's card until the theft is noticed and further use of the card is blocked. In addition to being a considerable problem for the card companies themselves, this illegal practice causes inconvenience and annoyance for the innocent user whose card has somehow been compromised.

Such fraud is a potential problem in various contexts, but recently has become of significant concern in Internet transactions in particular. Transmission of credit card information over the Internet has long been suspect due to the risk of individuals monitoring traffic over the network and then using that information for their personal gain. While secure networks and connections have been increasingly available over the past several years, many are nonetheless unwilling to transmit any credit card information over the Internet, due to the possibility that valuable credit card information could be intercepted.

In addition, monitoring, control and regulation of expenditures and finances is a frequent concern of companies and individuals. It is always desirable to provide apparatus and methods which improve the apparatus and methods for such monitoring, control and regulation. Accordingly, there are numerous improvements which have been heretofore unknown in the art, which improve the effectiveness, value, and/or the efficiency of credit cards, either in general or certain types of financial transactions.

SUMMARY OF THE INVENTION

It is an object of the present invention to provide improved credit cards and methods for credit card transactions.

It is a further object of the present invention to provide for customized use credit cards.

It is a further object of the present invention to provide for user-defined credit cards for use in financial transactions.

It is a further object of the present invention to provide for disposable credit cards.

It is a further object of the present invention to provide for limited use credit cards.

It is a further object of the present invention to provide methods and apparatus for secure transmission of credit card information.

It is a further object of the present invention to provide methods and apparatus for minimizing credit card fraud, and the amounts of loss that could occur should card information be intercepted.

It is also an object of the invention to provide methods and apparatus for transmission of credit card information over the Internet with a minimal risk of possible fraud or loss.

In addition to the prevention and reduction of fraud, it is a further object of the invention to provide improved types of credit cards, and improved methods for credit card transactions.

In accordance with the invention, a variety of new forms of credit cards and credit card methods are disclosed herein. In some of the disclosed embodiments, the cards and methods provide improved credit cards and methods providing for customization, limited use, single use (disposability), or so forth. Additionally or alternatively, in some of the disclosed embodiments, the cards and methods include new forms of credit cards designed to reduce or prevent fraud. In addition to, or as an alternative to the prevention of fraud, in some of the embodiments disclosed herein, new credit cards and associated methods are provided for the improvement of credit card transactions and/or for availability of an expanded array of financial products to consumers.

DESCRIPTION OF THE INVENTION

Figure 1:
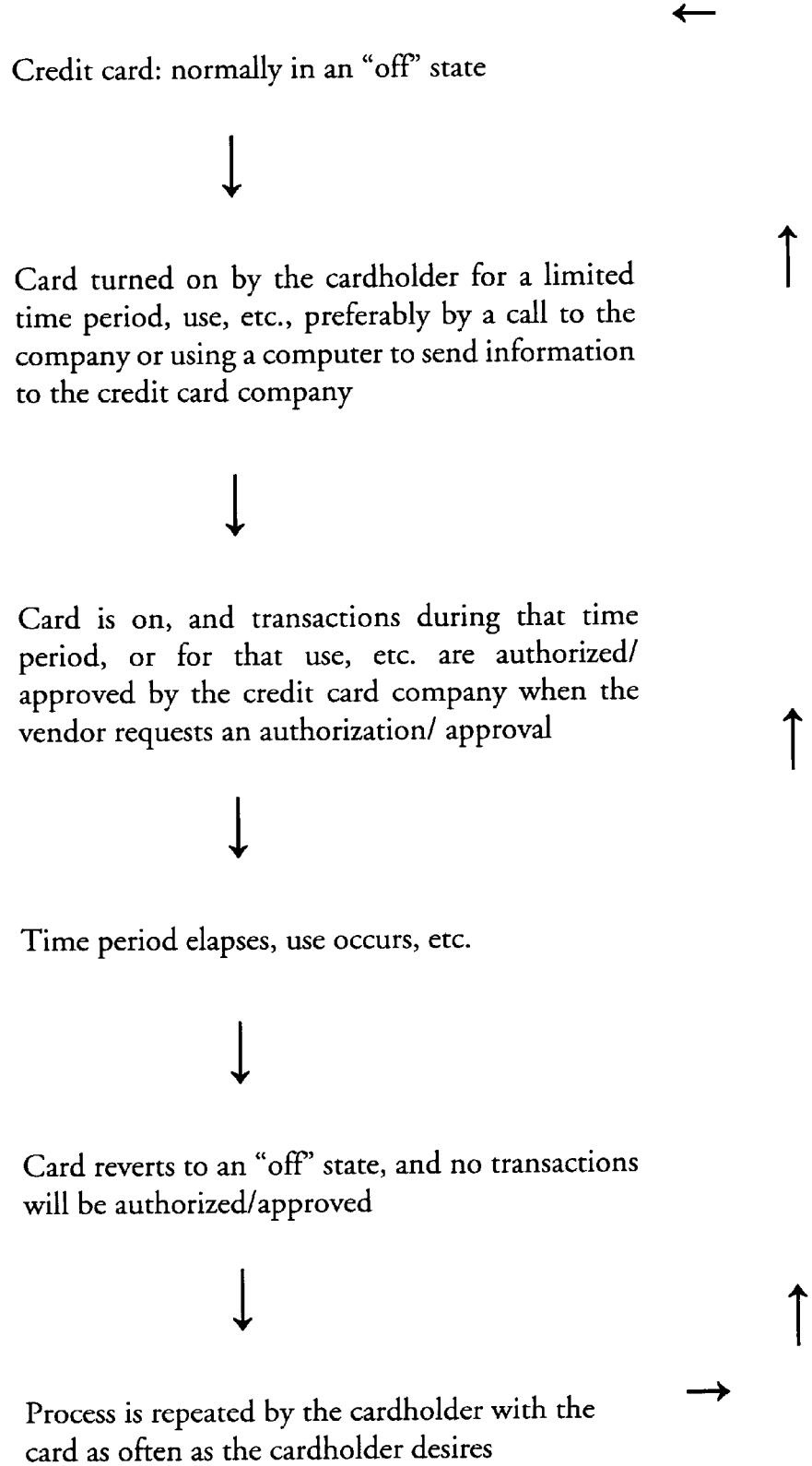
FIG. 1 is a schematic illustration of the customization of a credit card in accordance with one embodiment of the present invention.

In accordance with the present invention, in one embodiment of the present invention, to address the problem of credit card fraud, a new system of disposable credit card numbers is disclosed herein. These credit cards or credit card numbers are generated for a one time, single transaction basis, after which they are disposed of, or thrown away. The numbers can be used by a user over the Internet or any other communications system, whether open or secure, to effect a single transaction. After a one time use of the credit card number, the number is deactivated by the issuing credit card company such that it is no longer available for use. In this manner, a credit card company need not wait to learn whether a given credit card number has been intercepted, and one or more fraudulent purchases made (with the attendant possible loss of time, money and manpower investigating and resolving such matters) before dealing with the results of the potential theft. Rather, all numbers used over the network, or in a certain context, are assumed insecure, and once used for the first time, are no longer available for use. By doing so, the company, so to speak, "beats the thief to the punch," having already deactivated the number after a single use of the card, even before learning of the fraud.

In other embodiments of the invention, customized or limited use credit cards are provided. These cards are customized, preferably by the user, to suit the user's desires or needs. As a result, they provide methods and apparatus which have been heretofore unknown in the art, but which provide benefits that improve the efficiency, ease and uses of payment for goods and services.

Various embodiments of the inventions are possible consistent with the inventions herein. Although reference is occasionally made to either the disposable credit card embodiment or the customized credit card embodiment herein, the features disclosed in association with one can likewise be applied to the other, as well.

With respect to the credit card's number itself, in one preferred embodiment, for example, the credit card number is indistinguishable from permanent, ordinary credit card numbers. By making the customized credit card number indistinguishable from regular numbers both users and vendors are encouraged to use the credit card in the same manner as regular credit cards.

Similarly, by making the temporary disposable numbers (or likewise the customized credit card number) indistinguishable in appearance from regular credit card numbers, a potential thief is unable to tell in advance that a particular number is a disposable number, and already not valid. This may in turn enhance the potential of catching the thief by alerting the credit card company the first time someone attempts to illegally use the pilfered number.

With respect to either the disposable or the customized credit card, relevant information (such as the expiration date etc.) can either be printed on the card or verbally transmitted to the user. Likewise, the limited use nature of the card (either in a general sense or the specific limitations), the disposability of the card, the range of dates or validity of the card, etc. may either be printed on the card or transmitted to the user, whether verbally or in writing.

In another embodiment, the customized or the disposable number is the user's regular credit card number with a series of digits or alphanumeric characters either inserted therein, or tacked on at the end. This embodiment allows each customized or disposable card to be easily noted by the user to be a mere extension of his or her regular number.

Many of the embodiments herein could be used in conjunction with a policy by the credit card company (or by the main cardholder or the user) in which purchases from Internet transactions, for example (or purchases over unsecure networks), are only accepted if made in conjunction with a disposable or customized credit card number.

The invention can be practiced according to a wide variety of embodiments. In one embodiment, for example, a user dials into her credit card company before making a transaction, and after providing the ordinary credit card number and verification data, is provided with a disposable or customized number and/or mailed, provided with, or allowed to activate a disposable or customized card for a single or a limited range use.

In one embodiment of the invention, a user can indicate in advance of purchase, on the telephone call with the credit card company, what the single use or the customized credit card number is to be used for. This can be used to provide additional security and/or control the uses of the funds placed on that card.

In another embodiment, a user could be provided, each month or each year, with a set of disposable, one time only, or customized, limited use, numbers and/or cards, which are printed on the credit card statement for use during the next month or year, or which are mailed to the user. With respect to the disposable card, the user is instructed that, after use of the number once, the number may not be used again. With respect to the customized card, the cards can either be preset for certain uses, or the cards can be ready and waiting in the user's office or home for setting to the desired use when the user is ready.

The user could also be provided with a set of paper (or thin plastic) credit cards (preferably with magnetic strips), whether along with the customer's monthly statement, with a credit card encoder, with an encoding device which attaches to the computer and/or the Internet, or otherwise. Each of these credit cards could be used once, or on a limited or customized basis, after which the credit card could be ripped up and discarded. The cards could further have printing or indicia on them to remind the user that they are for one time only or customized use.

In a further variation on this approach, the paper cards and/or the provided numbers must be used in a specific required order, for additional security. These paper credit cards or provided numbers could be unusable until activated by the user, as is the practice with new credit cards that are sent out by mail.

In another embodiment, instead of ripping the credit cards up, the cards could have a portion which the user writes on to record the type of transaction, and the amount of the transaction. Alternatively, the card could have a portion which the user signs upon receipt and a portion which is later countersigned at the vendor, to provide additional security.

These credit cards could even have a portion which the user signs and provides to a vendor in a store. No vendor would ever, under one embodiment of the system, receive or have access to the user's permanent credit card number. Rather, the vendor (for example, a restaurant in which the user has just eaten) would receive a disposable credit card from the user's supply. The vendor could read the number off the disposable or customized card, could scan the number with a bar code scanner, could read a magnetic strip on the disposable card, or so forth. Upon being used once, the credit card can be marked, if desired, to show both that it has been processed to charge money to the person's account, and to show that it is no longer usable. This disposable card could be returned to the cardholder, saved as a receipt by either of the cardholder or the vendor, be returned to the credit card company, destroyed, or so forth. As noted above, signature could be provided once, or two signature lines could be provided, for the user to sign and countersign.

As yet another example, a user could be provided with a "calculator" of sorts, of credit card like thickness, which stores a predetermined number of disposable numbers therein. After using a number once, the user has to go back to the calculator to get the next number for the next transaction. This calculator could also be provided with a PIN number to prevent a party from accessing the numbers should the user's wallet be stolen or lost.

Alternatively, a card with multiple numbers stored thereon (which become activated in a predetermined sequence) can be provided, so that the actual credit card needs to be available (not just the credit card number) to determine the next available number in the sequence. In this way no single number alone is capable of compromising the user's account for more than one transaction, or of compromising the main number in the user's account. This card could have an LED or some other visually readable means to display the next available card number (either automatically or upon activation of a PIN, if desired). As mentioned above, part of the number could be the fixed, base portion (which is a number or portion common to all of the numbers)

and part of the number could be the variable portion (a number or portion which varies). Alphanumeric sequences or any other symbol or series of symbols can be employed for either or both of these portions.

In addition, since they are for use either on a one shot only or on a customized basis, the credit card or number could also be associated with a certain sublimit of the individual's or a corporation's credit limit. Thus, for example, a user with a $500 limit, for example, could call into the credit card company and obtain a disposable or a customized card which itself only has a $50 charge limit (for example, when the individual only intends to charge up to $50 in the next transaction, or to allow someone else to charge up to $50). This further limits the potential losses from a credit card fraud.

The present invention could also be used to provide a disposable card for a single transaction to users in general (or a customized card for a limited use), including users who do not have a permanent credit card. It could also be provided to users on a debit basis, based in whole or in part upon some reserve or funds provided to the issuing company in advance. Alternatively, the user could even identify the general or specific type and amount of transaction in advance, if desired.

The present invention, and the disposable embodiments in particular, is of additional value for use over the Internet. For example, the following system could be employed. Before a user makes a potential purchase over the Internet, he or she accesses one of his or her disposable credit cards or credit card numbers. As noted above, this could be accomplished by dialing into the credit card company, by removing one of a series of disposable cards from the user's monthly statement, or so forth. To effect the transaction over the Internet, the user transmits his or her credit card information to the vendor. That vendor then verifies the transaction and obtains an authorization code from the credit card company authorizing the purchase, as is currently standard practice with credit card transactions. To insure the integrity of the system, the vendor is required to verify the code immediately upon receipt. This prevents undue time from elapsing, which is undesirable from a security standpoint. Upon receiving the request for verification, the credit card company notes the identity of the vendor, authorizes the transaction (if the credit card number is valid and the purchaser has sufficient funds available), and forwards the authorization code to the vendor. At the same time, the credit card company also deactivates the credit card number from any further future use. Thus, if a thief intercepts the credit card information en route, when the thief later attempts to take that information and to use it in an illegal transaction, the transaction will be declined since the number has already been deactivated. After the number has legitimately been used once by the lawful owner, it no longer has any continuing validity.

If desired, to remind the user the vendor can transmit a message indicating both that the credit card number has been accepted, and that it is no longer of validity, and can therefore be ripped up. However, if used, this method runs the risk of also alerting a thief who is monitoring the Internet traffic.

The credit card company can also monitor all second requests for use of that credit card number which are transmitted to the system. This monitoring can be used to attempt to catch the thief during his future attempt to illegally use the card As additional security, each of the disposable credit cards can be given an expiration date, e.g. the end of the month or the end of the billing cycle. Thus, if the credit card is not used within the time limit, it expires. (This expiration date could be printed on disposable paper credit cards). This approach has been used in a different application by credit card companies with respect to checks that are sent with the statement to the user with a given expiration date. As far as the present inventor is aware, that system has been used by credit card companies with satisfactory results in the past.

The card company can also monitor the time of second requests. If the time of second request is extremely close to that of the first request, then the company can block both transactions on the grounds that a thief may be in the process of attempting to quickly intercept and use a credit card number en route before the user.

To further add to the security of the system, a function can be built into Internet software, such as the popular Internet browsers, in which a server assigns a universal time and date stamp (based for example on Greenwich Mean Time) to each credit card transmission transmitted by a user over the Internet. Thus the authorized user's transaction will be assigned a time and date, such that the credit card company can determine, when the same disposable number is sent twice within a short time frame, which transaction corresponds to the one in which the number was sent first. A function could also be provided in which the Internet address of the sender or some other password is encrypted and transmitted as well.

For example, a password which modifies over time and which is coded to the time/date stamp can also be integrated into the browser. The password is individual to each user, with the data summarizing the algorithm used to encode the password being provided to the user and to the individual's credit card company ahead of time (as part of the security information associated with the account). When the transaction is effected, the browser sends information to the internet provider's server, which sends back the universal time/date stamp. The browser then encodes the password and sends it back to the server with the credit card information to be transmitted to the vendor.

The present invention is not limited to use over open systems. Rather, it is intended that it can also be used over secure systems to provide an additional added level of security. Similarly, the invention can be used for those individuals who own credit cards and wish to purchase items over the telephone, but who are reluctant to give out or release their credit card information over the phone.

Likewise, although a variety of security procedures and methods are disclosed herein, any of the security procedures, protocols, encryption techniques, and so forth, used in the art, can be used in connection with the present disposable and/or customized credit cards.

If the disposable credit cards are stolen or lost, the credit card company can, of course, minimize loss by simply deactivating them upon learning of the theft or loss from the user. In addition, the placement of sublimits on each of the cards, or on the group of cards as a whole, further minimizes potential loss.

Although a disposable credit card number system is preferred, as described above, alternatively, a special, separate (disposable or customized) credit card number could even be assigned specifically for use over the Internet, whose use is subject to higher security measures, whether usable one or more than once. For example, after use, the user would have to call into the credit card company to verify the transaction, or the credit card company would call the user at a predetermined number (e.g. the user's home number) to verify that the user made the transaction. This alternative system could be used for example, exclusively with Internet transactions on secure connections, to provide an additional level of comfort to those users who are uncomfortable with transmission of card information even over secure connections. In the event of problems, this separate Internet credit card number could be deactivated separately from the main credit card number associated with the account.

In accordance with further embodiments of the invention, customized credit cards are also provided herein. These credit cards can be customized by the user such that they are only suitable or usable for particular subuses, for particular subframes of time, or so forth. This differs from the present practice in the art, which is to have credit card numbers which are valid for all uses, and for all periods of time until the card expires.

In the current practice in the art, for example, employees frequently make payments which are later reimbursed by their corporation. In accordance with the present invention, their corporation can issue customized credit cards, or obtain customized credit cards from a credit card company, which can serve certain limited uses, functions or so forth. This card can be customized in any of numerous ways. For example, the customized card could be set to be valid for a certain limited number of dates or until a certain date. For example, if an employee is going on a business trip for two days (or some other amount of time), the card could be set to be valid on only those two days. Thus, the employee is authorized to use the card for charges on only that time that the employee is away on the business trip, but not for any other time. Thus, in accordance with these embodiments, the card can have a user customized range of dates or series of dates. In one embodiment this is a range of dates with a commencement date and expiration date. (This is useful, for example, if an employee is going on a business trip, one or more cards could be issued which are valid for the dates of the trip, with the card not being valid before the trip starts or after the trip ends). In another embodiment the card becomes valid at any specific time (even a time of day) and ceases to be valid at any other specific time. Likewise, the card could become valid for a series of ranges of dates, even dates which are non consecutive or non contiguous. For example, it could be valid for a specific day or series of date in March (for a first business trip), become deactivated once that trip is over, can be reactivated for a specific day or dates in June (for a second business trip), be deactivated once that trip is over, and so forth. It could also be valid for a specific predetermined amount of time. For example, it could be valid for any one week period, beginning from when the user or subuser uses first uses it.

The card can also be customized for only particular uses or groups of uses. In this manner, the main cardholder (e.g. a corporation, a parent, etc.) can determine in advance what the card can or should be used for. For example, the card could be customized so that it is only good for airline reservations, such that if the employee tries to use it for any other type of charge, the charge will be declined, regardless of the amount of the transaction involved. Or the card could be customized so that it can only be used for airline and hotel charges. The types of uses which can be provided include any type of use that is currently charged or could in the future be charged on a credit card, or any combination of the same. Currently, charges which are placed on cards, include airline, hotel and car rental charges, restaurant bills, retail store purchases, and so forth.

The card can also be customized for use only by a specific individual, by certain groups of individuals, or so forth. A parent could provide a customized use card which is for use by his or her son or daughter, a corporation could provide a customized use card which is for use by employees, an organization could provide a customized use card for use by employees and/or members and so forth. Different cards or customization parameters could be provided for officers, board members, executives, or so forth.

As one example, an employee could be given authorization to purchase a new computer system. A customized credit card could be issued to the user which is only valid for use for that particular type of charge (computer hardware and software stores) and to the credit limit decided by the issuer or authorizing party at the corporation, such that if the employee tries to use it for anything else or for a charge in excess of that authorized, the charge will be declined. The card could even customized for use in a particular store itself or a particular chain of stores (such as a particular restaurant, or a particular chain of restaurants). Any of the features in the present application can also be combined —thus, the employee could be given a card for use in any computer store which is good for a total purchase of up to, for example, $2000 in value.

As another example, a parent could give a teenage child a card to go out and make a specific purchase for the child or for the parent. The card could be valid only for purchase on that particular day, to a certain designated purchase limit, and even, if desired only in a certain store, or group of stores or types of stores (e.g. clothing stores), or types of purchases or items. The main account could have, for example, a $1500 credit card limit, but the parent could set a $100 limit for use of the customized card on that particular day. Thus, if the card is lost or stolen, the card can not be used at stores other than the types chosen by the parent. Use in any other type of store or on any day other than that one day will cause the card to be declined. This minimizes the amount of credit card loss which can occur, and increases the chances of catching the thief. Likewise, the sublimit of $100 also minimizes the amount of loss which is possible.

The card could also be customized to be valid only in a particular region. For example, if the employee is going on a business trip from New York to Florida and back, the card could be set to be valid only in the States of New York and Florida, and not to be valid for charges in any other locations. If the card were lost or stolen en route, e.g. in a stopover in Georgia, and the thief attempted to use the card in Georgia, the charge would be declined, irrespective of the amount involved.

The amount of credit on the card could be as high as the credit on the main account, or alternatively, could also be customized. The main cardholder (e.g. the corporation, the parent, etc.) can set how much credit is on the particular card for the subuser (e.g. the employee). This can be done in some fixed manner, on the basis of some formula, or so forth.

Self transfer of funds and customization by the corporation or the user of the card is preferred. In other words, the corporation determines what uses and/or amounts are set on the credit card up to the corporation's total credit card limit.

In one embodiment, with respect to customization, the user receives one or more credit cards, each of which is inactive. Each card has a blank amount of credit, and no predefined use, i.e. the card initially has no credit available on it at all and no use available to it. When the user receives the credit card, or when the user is ready to activate the card, the user determines how much of his or her available credit he or she wants to transfer onto that particular card and what particular uses or types of uses are desired (or even all uses, if desired). For example, the user may decide that he or she wants to go to a particular place or store that day and have a certain amount of money with himself or herself (or wants to send his or her employee with a certain amount). In addition to or in place of carrying cash, the user could carry a card having a predetermined amount on it, and could even, if desired, set the places or types of places where the card will be active.

In another embodiment, a user can designate a single sum for use over a plurality of cards. This method overcomes a variety of problems present with the current methods of the art. For example, if a individual or couple wishes to go on vacation abroad, they often purchase traveller's cheques in any of a predetermined limited number of denominations (e.g. twenty, fifty, one hundred dollars, etc.) When using those cheques to convert money the couple often may not wish to convert the full sum (e.g. the full fifty dollars) at that one time, in that one place, or at that day's exchange rate, etc. Alternatively, the couple may be purchasing an item from a store, and the full cost of the transaction is often some odd number which is less than the denomination on the card. In this case, the individual or may not want to receive change back from the vendor in cash, since the vendor may be providing a disadvantageous exchange rate, or so forth.

Accordingly, in this embodiment, a single sum can be "distributed" over a plurality of cards. In this manner, the user designates a particular sum, and each of the cards in that plurality can draw upon that sum. The use of that card reduces the total sum available for the next cards in the series. In this manner, a user can use the customized or the disposable card for transactions whose sums do not amount to a whole number.

As a security feature, in plurality of card embodiments such as the former, it can be preestablished that not more of a certain percentage of the total sum available can be used on a single card, or can be used without verification of identity. For example, a 50% or 20% single use ceiling (or any other number) can be set by the credit card company or the user, to further guard against loss due to fraud. In this embodiment, if a transaction is attempted with any one card which is in excess of the predetermined ceiling for a single card, the card use can be temporarily blocked or subject to verification of identity, to verify that the card was not stolen and being used illegally for large transactions.

As a further security feature and customization parameter, the card can be set to have a desired level of security which must be comported with by the vendor for the transaction to be authorized. For example, some cards or transactions could require merely a signature, some could require the fingerprinting mentioned herein, some could require a showing of identification (including, if desired, picture ID) or so forth.

As discussed elsewhere herein, all cards in the series can be linked such that, if the cards are stolen, one call will cancel all of the cards.

As another formula, there can be also be a total available credit set by the corporation as customized for the year (or for some period of time, or for a particular trip, etc.) for a person, or for an entire department, or so forth, which can either be on one card, or distributed over several cards, as explained above.

Other combinations can be provided as well. For example, the card can be set such that there are certain combinations of customizations available. For example, each subuse can be associated with a specific credit limit for that subuse on that one credit card. Thus, the user may be told that he or she can spend up to $500 on air travel, $1000 on hotel rooms, $300 on car rentals, and those limits can be programmed into or preset to the card. Other combinations of dates of transactions, types of transactions, amounts for individual and/or total transactions, etc. on a single card, or on multiple cards, can be set as well.

If desired, the customized card could be preset or such that any purchases can only be delivered to a specific shipping address (e.g. the address of the corporation). Likewise, since the card is a customized card, any other special conditions of any sort could be attached to the transaction as desired or needed.

Many other embodiments can be implemented as well. A card can be issued to an individual, or to a department. Or, a group of cards can share a single credit limit. A card can be customized such that, when items are purchased by phone or over the Internet, etc., the only shipping address which will be accepted is a preset shipping address already assigned to the card (e.g. by the main cardholder). A card can be set to have a fixed maximum per transaction limit. It can be set to allow, or disallow cash withdrawals. A card can be set to send out a notification to the main cardholder upon each purchase, or upon each purchase meeting certain criteria (e.g. over a certain limit, pertaining to a certain category, or so forth). The notification could be set to include certain required information, e.g. when it was used and/or where it was used and/or how much credit is left or any other informationi desired. Likewise, a preapproval can be required before every purchase or before certain purchases, such as purchases over a certain limit, or purchases of a certain type.

Likewise, a card can be encoded for multiple uses or types of use. In one such embodiment, the card can be encoded such that it can be used for other magnetic card systems as well. For example, the customized card could be encoded such that it can also be used in place of some other existing card, e.g. as a metrocard (i.e. a fare card on the New York City subway system), as an EZ Pass (i.e. a card which is used to drive through tolls in New York or elsewhere), or so forth. These multiple use cards could either have a preset amount on them (as a debit card of sorts), or they could interface with the other existing card system (whether the Metrocard system, the EZ Pass system, or so forth) such that upon use of the customized card, the funds are taken out of the user's credit card account.

Or, in another variation on this embodiment, multiple brands of cards can be bundled together on a single customized card for ease of use of the user. The term "brand" is used herein to refer to the general card issuing authorities, whether Visa, Mastercard, American Express, Discover, etc. or to more specific issuing authorities, e.g. Citibank Visa, MBNA Mastercard, etc. In this embodiment, Visa and/or Mastercard and/or American Express etc. card accounts can be bundled together on a single credit card. When the user presents this single card to the vendor he or she has the option to decide which of those brands' account(s) on the card he or she wants to use for the transaction. This reduces the number of cards the individual has to carry. A single transaction could even be broken up among a series of cards if desired with the transaction statement indicating for example that $200 out of the $600 dollar purchase was charged to the Visa account, and an equal amount to the Mastercard and Amex accounts. Or, the main account holder could set up the card to be capable of some fixed total amount of charges (e.g. $1000) with the user free to use any of the accounts on the card in any combination desired to charge up to that amount. This is useful if some establishments accept only one or two of these brands, allowing the user (e.g. the employee, the child, etc.) to use the customized card as establishments that accept any of the brands on the card. Or, for purposes which may be beneficial to the main account holder (e.g. for purposes of frequent flyer mile programs, membership dollar programs, etc.) the customized card could be set up such that all of one or more subtypes of use is charged onto one brand, all of another or more subtype onto a second brand etc. For example, the card could be set such that all airline charges are charged onto the Amex Card, all retail store purchases to the Visa, all hotel reservations to the Mastercard, etc. This could be by the customization of the card which only allow certain types of use of each account, and/or by codes which automatically select the appropriate brand or card account when the user attempts to use the card. This could be in any customization scheme desired. For example, in another embodiment, the first $x amount could be charged to one card account, the next $y dollar amount to another card account, or so forth.

In accordance with a preferred embodiment of present invention, a card could be issued to be always "off", unless the main card or account holder, or the authorized person on the card (i.e. the person given the authority to control the uses of the accounts on the card), authorizes or sets or turns the card and/or a specific use of the card "on" for either a particular time period, or for use until certain conditions are met. For example, the card could be issued to an employee or to a child, and normally be in an "off" state (as opposed to general purpose or regular credit cards which are normally in an "on" state) which can not be used, until the main cardholder authorizes that the card be turned on for the next day (and the next day only). Or, the card could be turned on until one transaction is conducted using the card (or some specified multiple number of transactions are conducted using the card), or a specific use is effected of the card, or turned on in accordance with any of the other customizations of the card described herein. In accordance with this embodiment, the card normally remains "off", but is occasionally or periodically turned "on" for a while to allow the card to be used for a desired purpose. After that purpose has been accomplished, the card goes back "off" again. In this manner, the card can be turned on and off by the user as often as desired or necessary.

In another embodiment of the present invention, the user can maintain a list of available credit card numbers in his or her computer and/or software program, with the list further indicating the specific customized use of each number. Alternatively, the user can maintain a list by hand, or a list can be provided each month with the user's statement. If desired, the uses of each number can vary over time. If an unauthorized user intercepts the first credit card number and attempts to use it for a use that it is not enabled for, the transaction will be declined. For example, a user could maintain 5 separate numbers (or any other desired number), each of which is linked to the main card account. Today, one particular number could be authorized for booking airline tickets for the current business day (but no later), while tomorrow a different number could be authorized for that purpose.

Customization (and activation) of the card or a specific credit card number can be in any of the ways known in the art. In a simple method, for example, the user can call the credit card company and, once his or her identity has been verified, can direct the credit card company to customize the card (or a specific credit card or credit card number on the account) in the manner desired and/or to activate that specific credit card or credit card number. In a variation on this method, the user could be required to call from his or her home phone, with the phone number being verified at the credit card company using "Caller ID".

In another embodiment, the user can use a computer to dial in over a direct connection (or over the world wide web or the Internet on a secure connection) to the credit card company, and program in the desired characteristics using the user's computer. In this embodiment, a software program can be provided to customize and/or activate the card and/or the user can access a web site (i.e. at the credit card company) where a form can be filled out by the main cardholder (or by the authorized person on the card or an authorized card user) to set the desired customization parameters. This form could then be accessed as often as desired to update and/or modify the customization of the card or specific credit card numbers, check the status or usage of the card or specific numbers, etc. In addition, as a further embodiment, authorizations done using this program or connection could be compared (either automatically or upon demand by the user) against actual purchases recorded by the credit card company against the card. In this manner a "cross check" is provided, so that if a limited use, customized or disposable card transaction comes into the credit card company which was not authorized by the cardholder, it will show up on the cross check. In a further embodiment, this cross check could be effected automatically (e.g. each time the user logs, in), periodically (e.g. once per day or per some set time period), upon the user's activation of this feature, or upon the user's deliberate initiation of a cross check.

In some embodiments, the main cardholder orders or obtains the card from the credit card company. In other embodiments, the main cardholder issues or activates the credit cards off of his or her main account him or herself, after transmitting the necessary customization information to the card company, and obtaining the necessary authorization.

If desired, a customized credit card could be converted to a regular, general purpose credit card, or vice versa, if desired. This can be used to deal with changing circumstances, needs or desires of the main cardholder, the card user, the corporation, etc. By a "regular" or "general purpose" credit card, the present inventor refers to those credit cards currently used in the art, which have no limitations on their use other that the card be valid (e.g. be before the expiration date and be of an account in good standing), that the person using the card be the authorized user, and that the transaction be within the available credit left on the card. Subject to those provisions, such cards can be used at any time for any types of purchases at any vendor accepting that type of card.

Should a card or any of the plurality of cards be stolen, a user can with one call deactivate one or all of the cards at the same time. Moreover, since these cards are preferably all linked to the user's main credit card account, and are thus individually on file with the credit card company under that account, the user does not need to worry about safekeeping or storing the list of separate cards or numbers.

As a further security feature, a disposable or customized credit card can be provided with a "fingerprinting area". During use of the card, the user can be asked to place a particular finger on a certain portion of the card to form a fingerprint which can later be used to verify whether the card was used by the rightful owner or used illegally by someone without authorization. Preferably, this area is covered by a flap (e.g. a plastic cover) which is lifted or removed before fingerprinting, to prevent stray marks or fingerprints from appearing on the area before it is ready for use.

With respect to those which are for a single use only, the user can sign (and/or fingerprint) the back of the card, and the vendor could submit or return the cards to the credit card company if desired. Alternatively, the vendor could be required to scan the cards into an appropriate system, with a record of the scan going to the credit card company.

Alternatively, in a further invention, instead of using a "fingerprinting area" on a disposable or customized card, such an area can be placed on the vendor's bill or documentation which currently in the art is signed by the purchaser.

In accordance with another embodiment of the invention, the cards could each have their own PIN number, or PIN numbers.

Upon use of the card, the information regarding the transaction is transmitted to the credit card company, as is known in the art. In a further embodiment of the invention, the information on each purchase from a vendor is transmitted directly to the user after the transaction is completed so that the user can directly monitor and keep records of his or her usage, without waiting for the credit card statement to come in. This information can be sent to the user in any manner desirable. For example, it can be transmitted over the Internet to the user, to the user's web page, or so forth. Instead of the user, it can be transmitted to a third party, if desired; for example, if the card is being used as an expense card for an employee's expense account at a corporation (as described herein), the information can be transmitted directly to the corporation. This transmission can be done by the credit card company itself. Alternatively, if desired, the system can be set up such that the information is transmitted at the point of sale. This can be done with or without the credit card embodiments described above as a permanent or automatic recordkeeping system.

In the preferred embodiment, these credit cards are can be used, processed, etc. by a credit card company in the same manner as with its regular credit cards, with the exception that the present cards provide the additional features provided herein.

One of the current problems with a regular card, whether it be a credit card, a debit card, or so forth, is that a thief potentially has full access to all of the credit or funds in your account, until the theft or unusual activity is discovered and/or blocked. In the present invention, as described above, a certain set level of funds or type of use of funds can be segregated aside by the user for a desired period, use, or so forth, while maintaining the integrity of the main account intact (and even potentially maintaining the identity or details of the main account secret).

Although the term credit card is used throughout the present application, the intention is to include credit cards, charge cards, and debit cards by that term, unless otherwise stated. In addition, the present inventions can be used with other cards used for purchases or transfers of funds, as well.

Having described the invention with respect to specific embodiments, it is not intended that the description serve as a limitation on the scope of the invention since other variations on the invention are possible, and may be apparent or derived herefrom.

What is claimed is:

1. An item, comprising:
  a financial card, said financial card having been provided by a credit card company at the request of a first person, said financial card being provided for use by any person determined by such first person; and,
  wherein said financial card is further customized such that it is limited to use for only a particular type of transaction, said type of transaction being purchases at predetermined vendors of a predetermined identity, such that said customized card will be valid at those predetermined vendors, and will not be valid at the other vendors accepting cards from that credit card company.

2. A method as claimed in claim 1, wherein said credit card is an American Express® brand credit card.

3. A method as claimed in claim 1, wherein said credit card is a Visa® brand credit card.

4. A method as claimed in claim 1, wherein said credit card is a Mastercard® brand credit card.

5. An item as claimed in claim 1, wherein said credit card is a card comprising a magnetic strip.

6. An item as claimed in claim 1, wherein said credit card is not a smart card.

7. An item comprising:

a website on the world wide web, said website being the website of a credit card company where requests can be made for a financial card, wherein said financial card is a card requested by a first person and which is provided by the credit card company for use by any person of the first person's choice; and, wherein said credit card is further customized such that it is limited to use for only a particular type of transaction, said type of transaction being purchases at predetermined vendors of a predetermined identity, such that said customized card will be valid at those predetermined vendors, and will not be valid at the other vendors accepting cards from that credit card company.

8. An item as claimed in claim 7, wherein said website comprises a form to be filled out by the first person to request said activation of said credit card.

9. An item as claimed in claim 7, wherein said credit card is a card comprising a magnetic strip.

10. An item as claimed in claim 7, wherein said credit card is not a smart card.

11. A method comprising:

requesting a financial card from a credit card company via a website on the world wide web, said requesting of said credit card being by a first person, said financial card being provided by the credit card company for use by any person of the first person's choice; and, wherein said request is for said financial card to be customized to be limited to use for a particular type of transaction, said type of transaction being purchases at predetermined vendors of a predetermined identity, such that said card will be valid at those predetermined vendors and will not be valid at the other vendors accepting cards from that credit card company.

12. An item as claimed in claim 11, wherein said credit card is a card comprising a magnetic strip.

13. An item as claimed in claim 11, wherein said credit card is not a smart card.

14. A method, comprising:

providing a financial card, said financial card being activated by a credit card company, said card being a card requested from the credit card company by a first person, said financial card being provided by the credit card company for use by any second person of the first person's choice, said card being a card provided in response to a request from the first person via a website over the world wide web for said card; and, providing said card as a customized card which can only be used for a particular type of transaction, said type of transaction being purchases at predetermined vendors of a predetermined identity, such that said card will be valid at those predetermined vendors, and will not be valid at the other vendors accepting cards from that credit card company.

15. A method as claimed in claim 14, wherein said credit card is an American Express® brand credit card.

16. A method as claimed in claim 14, wherein said credit card is a Visa® brand credit card.

17. A method as claimed in claim 14, wherein said credit card is a Mastercard® brand credit card.

18. An item as claimed in claim 14, wherein said credit card is a card comprising a magnetic strip.

19. An item as claimed in claim 14, wherein said credit card is not a smart card.

20. An item as claimed in claim 1, wherein those predetermined vendors are limited to restaurants.

21. An item as claimed in claim 1, wherein the spending limit on said card is set by the first person.

22. An item as claimed in claim 1, wherein said card is provided to the second person based on funds provided to the credit card company in advance.

23. An item as claimed in claim 7, wherein said card is customized such that it is limited for use only at restaurants.

24. A method as claimed in claim 11, wherein said card is customized such that it is limited for use only at restaurants.

25. A method as claimed in claim 14, wherein said card is customized such that it is limited for use only at restaurants.

* * * * *